US006952171B2

(12) United States Patent
Puccioni

(10) Patent No.: US 6,952,171 B2
(45) Date of Patent: Oct. 4, 2005

(54) METHOD AND SYSTEM FOR CONTROLLING URBAN TRAFFIC VIA A TELEPHONE NETWORK

(76) Inventor: Vanni Puccioni, 35, Piazza D'Azeglio, 50100 Firenze (IT)

(*) Notice: Subject to any disclaimer, the term of this patent is extended or adjusted under 35 U.S.C. 154(b) by 158 days.

(21) Appl. No.: 10/466,746

(22) PCT Filed: Jan. 18, 2002

(86) PCT No.: PCT/IT02/00029

§ 371 (c)(1),
(2), (4) Date: Jul. 17, 2003

(87) PCT Pub. No.: WO02/058031

PCT Pub. Date: Jul. 25, 2002

(65) Prior Publication Data

US 2004/0048628 A1 Mar. 11, 2004

(30) Foreign Application Priority Data

Jan. 19, 2001 (IT) ..................................... FI2001A0012

(51) Int. Cl.[7] .................................................. B60Q 1/48

(52) U.S. Cl. ............................. 340/932.2; 340/825.28; 340/5.8

(58) Field of Search ......................... 340/932.2, 825.28, 340/5.8; 379/37, 67.1, 74; 368/90; 180/199; 705/13

(56) References Cited

U.S. PATENT DOCUMENTS

| | | | | | |
|---|---|---|---|---|---|
| 5,940,481 | A | * | 8/1999 | Zeitman | 705/13 |
| 6,282,491 | B1 | * | 8/2001 | Bochmann et al. | 701/209 |
| 6,411,895 | B1 | * | 6/2002 | Lau et al. | 701/209 |
| 6,501,391 | B1 | * | 12/2002 | Racunas, Jr. | 340/932.2 |
| 6,796,499 | B1 | * | 9/2004 | Wang | 235/384 |

FOREIGN PATENT DOCUMENTS

| | | |
|---|---|---|
| WO | WO9719568 | 5/1997 |

* cited by examiner

*Primary Examiner*—Jeffery Hoffsass
*Assistant Examiner*—George A. Bugg, Jr.
(74) *Attorney, Agent, or Firm*—Grant E. Pollack

(57) ABSTRACT

A method and system are disclosed for controlling use of predetermined vehicle parking areas and/or transit in predetermined vehicle circulation areas. The system comprises a control unit in communication with a telephone network and a database, the database storing data including an electronic map of one or more of such areas. When the control unit receives a Short Message Services (SMS) message from a user, via the network, requesting access to one of the areas at a selected time, the message is com-pared to data in the database in order to assess whether or not to comply with the request. If it is determined that the request should be complied with, then the database is updated with an indication of an access reservation. The unit then sends the user an SMS message in response, either confirming the reservation or denying availability of access.

19 Claims, 2 Drawing Sheets

METHOD AND SYSTEM FOR CONTROLLING URBAN TRAFFIC VIA A TELEPHONE NETWORK

FIELD OF THE INVENTION

The present invention relates generally to transportation systems and, more particularly, to a system and method for controlling circulation of urban vehicles or the like.

BACKGROUND OF THE INVENTION

In recent years, traffic flow in urban areas has become increasingly difficult to control. This has been found especially problematic in urban city centers where space is particularly limited and unable to accommodate the steadily increasing volume of vehicles that often concentrate there. It is also considered challenging not only in terms of transitory, short-term parking and/or long-term parking requirements, but also for protecting urban residents and buildings from atmospheric and noise pollution.

Efforts have been made to solve these problems, such as providing extensive classification of parking areas (i.e., dividing them into free parking zones, paid parking only parking zones, residents only parking zones, etc.). Although useful, difficulties have been experienced with patrons observing the various established regulations as well as relying on private and government authorities to enforce the same. Another approach has been institution of limited traffic areas. Such an approach, however, it has been found, also falls short of the level of traffic control that is desired.

OBJECTS AND SUMMARY OF THE INVENTION

Accordingly, it is an object of the present invention to provide a method and system for controlling the flow of urban vehicle, especially but not exclusively in waiting, short term and/or long term parking areas, that provide considerable advantages both for users and for parking administration and surveillance authorities.

It is another object of the present invention to provide a method and system for controlling urban traffic that allows a user to obtain a parking place in a desired location, quickly and reliably, so as to reduce, or even eliminate, annoying and distressing waiting times.

Furthermore, it is an object of the present invention to provide a method and system for controlling urban traffic that not only limit atmospheric and noise pollution, but also bring about significant energy savings and, thereby, reduce management costs, especially those resulting from decreased need for surveillance of parking areas.

In addition, it is an object of the present invention to provide a method and system for controlling urban traffic that provides effective improvement both in the procedures for searching for, finding and allocating the available parking spaces, and in limited access criteria for zones of urban traffic areas.

These objects and advantages are achieved by a method and system, according to the present invention, for controlling use of predetermined vehicle parking areas and/or transit in predetermined areas for traffic flow, comprising the steps of: receiving a Short Message Services (SMS) message from a user through a control unit in communication with a telephone network, the message requesting access to one of the areas at a selected time; the control unit identifying the user at least by his/ her telephone number, comparing the message to a database that includes electronic mapping data relating to the one or more areas, in order to assess whether or not to comply with the request, and updating the database with an indication of an access reservation; and sending the user an SMS message confirming the reservation or denying the availability of access.

In accordance with another aspect of the present invention, a system is provided for controlling vehicle access to one or more parking and/or circulation areas, the system comprising a control unit with a computer in communication with a telephone network via an SMS messaging platform, the unit being capable of: storing a database comprising electronic mapping data of the one or more areas; receiving through the network SMS messages requesting access to one of the areas; comparing the message to the database in order to assess the possibility of complying with the request, in the affirmative updating the database with an indication of access reservation; and, in response, sending the user an SMS message confirming the reservation or denying the availability of access.

By the present invention, a user may now reserve a parking space and, thereby, eliminate long and sometimes fruitless searches for parking. Absent confirmation, i.e., when no spaces are available in the required area or in neighboring ones, the user may—as far as possible—avoid traveling to the area or resort to public transportation. The resulting reduction of traffic that ensues from users searching for free parking places yields remarkable energy savings and results in a significant drop in atmospheric and noise pollution. Briefly, traffic is transferred from a real scenario (i.e. where actual vehicle traffic flow takes place) to a virtual one (i.e., a circulation of messages/information), with all the evident advantages which may be derived therefrom.

The system according to the present invention now makes it possible to implement a number of specific procedures that provide highly efficient exploitation of available parking and access to limited traffic areas, in real-time and at a minimum cost for managing the same. More particularly, it is now possible to obtain relevant information about present and future traffic flow, based on which a series of supplementary functions may be carried out, both for analysis and verification, in order to improve organization of transportation (e.g., management of services relating to offers/requests made between users for rides to selected destinations), as well as for public security.

BRIEF DESCRIPTION OF THE DRAWINGS

A specific, illustrative method and system for controlling urban traffic via a telephone network, according to the present invention, is described below with reference to the accompanying drawings, in which.

The same numerals are used throughout the drawing figures to designate similar elements. Still other objects and advantages of the present invention will become apparent from the following description of the preferred embodiments.

DETAILED DESCRIPTION OF PREFERRED EMBODIMENTS

Figure 1:
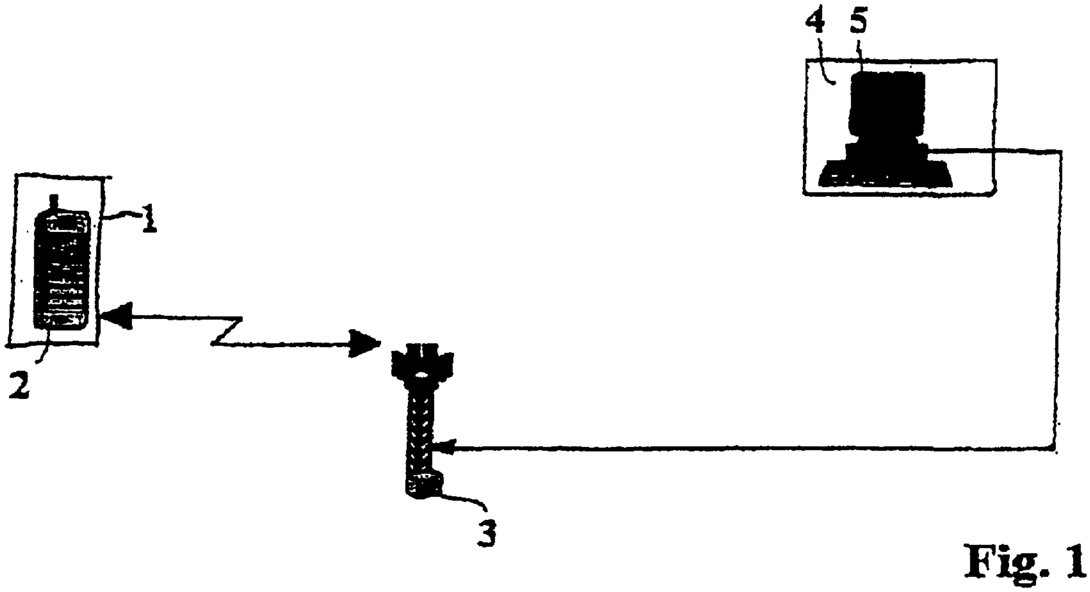
FIG. 1 is a block diagram of a system, according to one aspect of the present invention.
Figure 2:
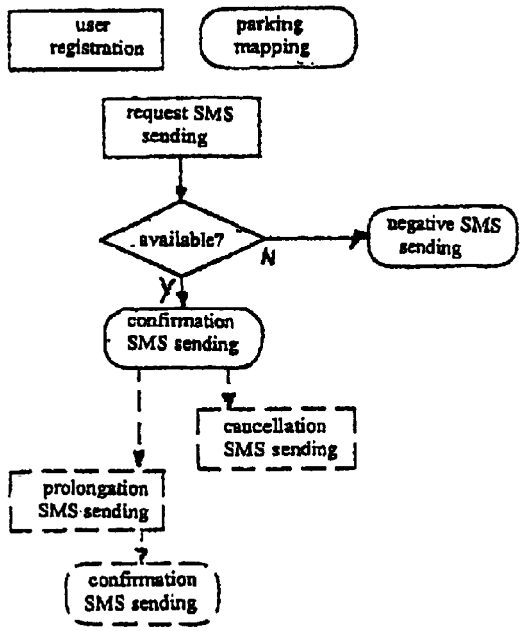
FIG. 2 is a flowchart of a method according to the system of FIG. 1.

Referring now to the drawings and, more particularly, to FIGS. 1–4, there is shown generally a specific, illustrative method and system for controlling urban traffic, in accordance with the present invention. In one embodiment, as shown in FIGS. 1 and 2, a system is provided for controlling specific parking areas, a user 1 having a telephone 2, for instance and preferably, a mobile or fixed appliance capable of sending SMS messages, in communication with a control unit 4 via a telephone network 3. Alternatively or concurrently, the network is desirably integrated or associated with a distributed communications network, namely the Internet. In this connection, it is preferred that the control unit utilize a so-called "messaging platform" for management and delivery of SMS messages, the platform being associated with a computer 5 having suitable software for effecting the same. Such software desirably includes a previously entered and stored electronic map of relevant parking areas with the available parking places identified and numbered.

The steps executed by the user and the control unit are indicated using squares with sharp and by round angles, respectively, in FIG. 1, wherein a user 1 proceeds with a preliminary registration step in which, e.g., pursuant to payment, a password for accessing the system is assigned.

Before commencing a trip in the vehicle, the user sends the control unit an SMS message that contains, in accordance with a predetermined format, a reservation request for a parking place in the controlled area that is nearest to the travel destination, for a selected period of time (defined by the beginning and ending hours of parking). The reservation, which must be sent with a preset time advance (e.g., one hour), may also include an indication of one or more additional areas where an available parking place should be sought in the event that the first parking place in the controlled area is booked.

Control unit 4 receives the SMS message request, identifying the user at least by his or her relevant phone number. After determining the availability of a parking place in the one or more areas specified by the request, the control unit sends a confirmation SMS message (should a space be available) or a negative one (if the request cannot be satisfied). One desirable characteristic of SMS messages is that they can be accepted directly in digital format by an information system and, more particularly can be input as fields in commercially available database software (ODBC and JDBC standards). This makes receipt/treatment of the users' requests especially simple and straight forward.

The confirmation SMS message preferably contains a relatively precise indication of the parking place that has been booked. Upon receipt of the message, the user may then be reasonably certain that a parking space can be found when his or her travel destination has been reached. If a user wishes to cancel the reservation, he or she may do so by sending a further SMS message, sufficiently in advance of the beginning of the established parking time, or a fine may be levied.

Extraordinarily unreliable users, that is, those who have been assessed a number of fines in a pre-determined period of time, may be suspended (temporarily or permanently) from the system. Desirably, the same applies to users who, at the end of the booked parking time, do not make the parking place available for use by the next user, or do so much earlier than the time due without notifying the control unit, accordingly.

More specifically, when the booked time lapses, the control unit considers the parking space available once again and, therefore, bookable—if not already booked—by other users. Alternatively or concurrently, the system may offer a right of option for continued occupation of the space after the initial parking time has lapsed. Preferably, this option may be exercised only if timely notice of the same has been sent to the control unit.

If a user has not made the booked place available upon arrival of a user who has booked the place for the subsequent period, the second or subsequent user notifies the parking administration and/or surveillance authorities by sending an SMS message to the control unit. The control unit then assigns the second user a substitute parking place, such preferably being selected from among an emergency reserve, and notifies the local police of the transgressing vehicle—the police desirably being equipped with towing-away means. It will be appreciated by those skilled in the art that, because the users themselves are involved, parking administration and/or surveillance costs are remarkably decreased. Notwithstanding, the police may conduct surveillance directly, identifying the transgressors before and/or independently of the users' warnings. In this case, the control unit is notified by the police of the omitted communication of cancellation, or of an earlier exit from the parking space. In this manner, parking surveillance work may be carried out by operators in constant contact with control unit 4.

Figure 3:
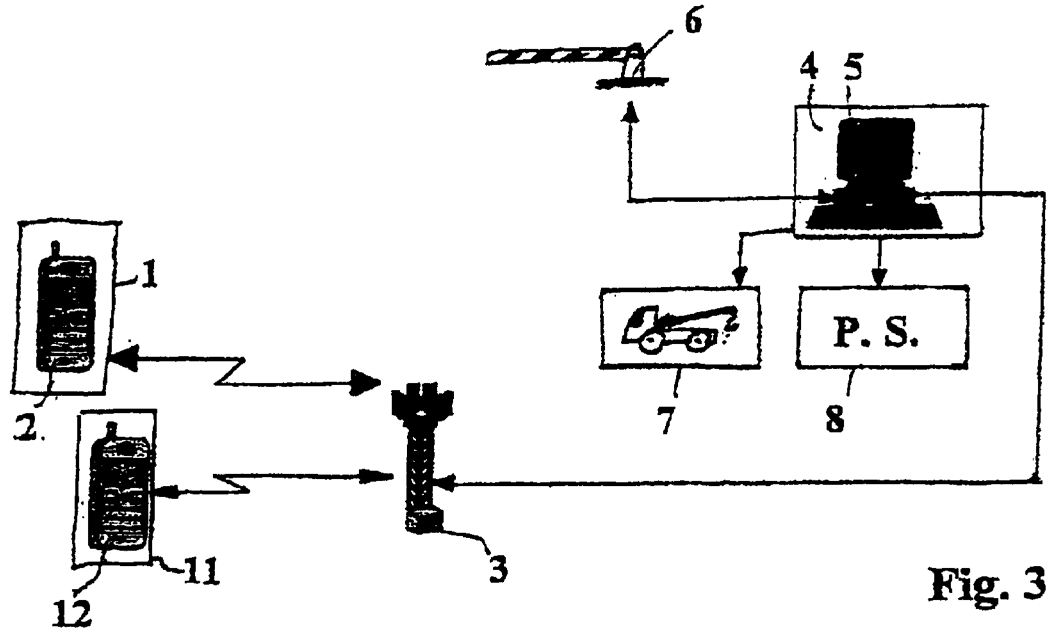
FIG. 3 is a block diagram of a system according to another aspect of the present invention.
Figure 4:
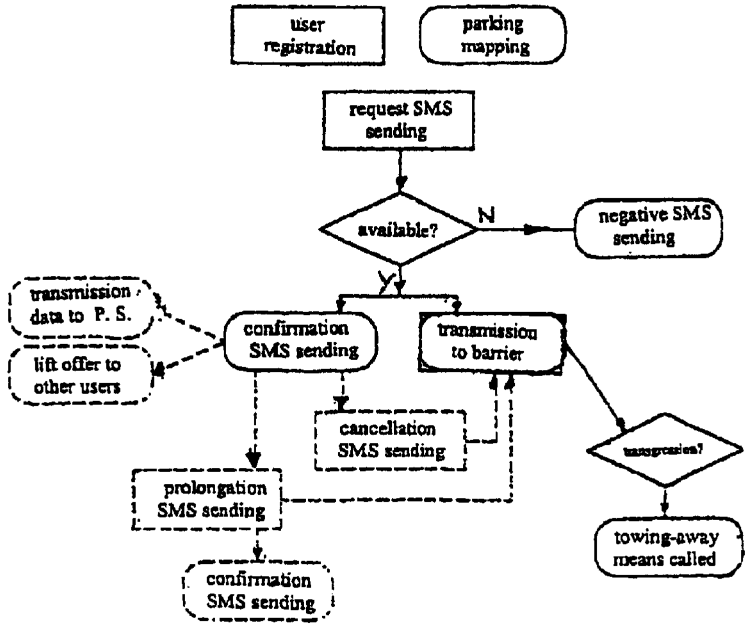
FIG. 4 is a flowchart showing a method according to the system of FIG. 3.

Turning now to FIGS. 3 and 4, a second and generally more complex embodiment of a method, according to the present invention, is illustrated. The areas which are controlled for parking or access restriction (a.k.a. limited traffic areas) are equipped with means 6 for blocking the vehicles, e.g., of a type that utilizes a movable gate. Above and beyond the steps described above in connection with the first embodiment, the SMS message sent to the user for confirming the reservation also contains a code for opening the blocking means 6. More precisely, the control unit 4 transmits the code to the user and to the blocking means, so that the latter can recognize the incoming user and let him or her pass. Indeed, the user may use the code to open the gate, for instance, by entering it on a keyboard. The same code can also be used to exit the controlled area at the end of the booked period. In addition, the code may coincide with the license plate number of the user's vehicle and, in such case, transmission thereof to the blocking means can suffice. Exiting of the user from the controlled area may then be permitted using a reading or detection operation carried out, e.g., via video camera means.

In further accord with the second embodiment described above, blocking means 6 preferably transmits, to the control unit, information in real-time concerning the actual status of the controlled area. In this manner, the control unit can compare the information to the reservation timetable, promptly detect a user's transgression, and communicate the same to a police station entrusted with sending towing-away means.

Alternatively or concurrently with the aforementioned embodiments, management procedures may advantageously be implemented which are different for different kinds of users (e.g., assigning a special right of access to the handicapped, residents and/or authorized users, or shop customers), for different times (i.e., regulations that vary according to the time of the day and/or the day of the week) and for different kinds of parking (such as unrestricted duration or short term parking). In particular, the offer of parking places may be varied and distributed among different areas to avoid concentration of incoming and/or outgoing traffic.

The ability to control of traffic flow, by analyzing the database of SMS messages received and sent, can be also exploited for check and survey purposes. The data stored in the database, constantly and automatically updated, enables outgoing traffic flow to be forecast and the effect of the various management options to be estimated. As the database grows, it will be possible to refine such forecasts and, in turn, among other things, optimize interventions such as traffic light programming, distribution of police patrols, and information to users.

A method and system, according to the present invention, may also provide further supplementary functions, reference being made especially to the second embodiment described above (See FIGS. 3 and 4). According to one such function, the reservation request of a user 1 may indicate a willingness to offer rides, on the way to his or her destination, to other users 11 having respective telephones 12. Such users 11 have previously sent to control unit 4 respective SMS messages asking for a lift.

The control unit then tries to match the offer of a ride with the request for a lift and informs, again via SMS messages, the two or more users involved as to the time and place of the meeting or pickup. To this end, a network of pickup points or meeting places may be set beforehand. In such case, a specific meeting place is chosen by the user in his or her offeratory SMS message, and communicated thereafter to the lift-demanding user. A user may be encouraged to offer rides to others by providing him or her incentives or prizes, e.g., a right of priority in the assignment of parking places. This would require that, for safety reasons, not only user 1 but also users 11 who desire rides be registered with the system, and thus specifically identifiable.

Identification of users and related vehicle movements, possibly by associating each user with a license plate number, offers the further capability of utilizing the method and system for public security purposes. In fact, control unit 4 may make available its database, and relevant information on SMS messages sent and received, to a central station 8 of a police or public security department. This information may then be exploited for preventing or punishing criminal acts such as thefts, robberies or terrorist acts. In this connection, license plate number checks have been found a very strong deterrent to car theft.

A further option provided by the method and system, according to the present invention, is auctioning off the available parking places. For instance, a user 1 specifies a tariff range that he or she can afford, so that the control unit will automatically assign him or her the cheaper parking place among those available in the tariff range specified. The reservation SMS message request may also include a request for information on how to reach the destination parking or circulation area. Such information is preferably given through the SMS message confirming the reservation.

Overall, the system and method, according to the present invention, beneficially provides interaction between users and a control unit via a telephone network, is suitable for a variety of applications, and is advantageously carried out using specific management software and hardware.

Various modifications and alterations to the present invention may be appreciated based on a review of this disclosure. These changes and additions are intended to be within the scope and spirit of the invention as defined by the following claims.

What is claimed is:

1. A method for controlling use of predetermined vehicle parking areas and/or transit in predetermined vehicle circulation areas, comprising the steps of:

receiving a Short Message Services SMS message from a user through a control unit in communication with a telephone network, the message requesting access to one of the areas at a selected time;

the control unit identifying the user at least by his/her telephone number, comparing the message to a database that includes electronic mapping data relating to the one or more areas, in order to assess whether or not to comply with the request, and updating the database with an indication of an access reservation; and sending the user an SMS message confirming the reservation or denying the availability of access.

2. The method set forth in claim 1, whereupon reserving a parking place in the controlled area, the SMS message request includes an indication of beginning and ending hours for parking, the SMS message confirmation including information identifying a place that has been reserved.

3. The method set forth in claim 2, wherein the SMS message request includes an indication of at least one further controlled area.

4. The method set forth in claim 1, wherein the control unit communicates only with those users who have been registered, by assigning them an access password, the message request including the password.

5. The method set forth in claim 1, wherein the user having confirmation of the reservation obtains a right of option for reserving an additional parking time, such right to be exercised within a predetermined period of time before the initial parking time has lapsed.

6. The method set forth in claim 1, wherein the control unit receives information on users who have not respected the reservation.

7. The method set forth in claim 6, wherein a user, after discovering that the place he/she had reserved is not free, so informs the control unit via a first SMS message and the control unit, in reply and via a second SMS message, assigns the user a substitute place, selected among an emergency reserve.

8. The method set forth in claim 1, wherein access of the vehicle to parking and/or access areas corresponding to the reservation is blocked, the SMS message sent by the control unit including a code to be used for unblocking the same, the control unit transmitting the code also for blocking the same.

9. The method set forth in claim 8, wherein the blocking is accomplished by transmitting real-time information to the control unit concerning the actual state of the relative controlled area.

10. The method set forth in claim 9, wherein the control unit forwards the information to a police station entrusted with sending of apparatus for towing away the transgressing vehicles.

11. The method set forth in claim 4, wherein registration of a user involves association of the same with the license plate number of a vehicle.

12. The method set forth in claim 1, wherein the SMS message request includes an indication that a lift is offered on the way to a controlled area, whereby the control unit, having received from other registered users lift-demanding SMS messages, compares the demands to the available offers and, in response, sends the involved users confirmatory SMS messages, indicating the time and place of a meeting, or negative SMS messages.

13. The method set forth in claim 12, wherein a user sending the lift offer receives a right of option ahead of other users in future reservations.

14. The method set forth in claim 1, wherein the SMS message request includes an indication of a parking reservation tariff that the user can afford to pay, the control unit complying with the request on the basis of the tariff indication.

15. The method set forth in claim 1, wherein the SMS message request includes a request for information on how to reach the destination parking and/or circulation area, the information being given through the SMS message confirming the reservation.

16. A system for controlling vehicle access to one or more parking and/or circulation areas, comprising a control unit with a computer in communication with a telephone network via an SMS messaging platform, the unit being capable of: storing a database comprising electronic mapping data of the one or more areas; receiving through the network SMS messages requesting access to one of the areas; comparing the message to the database in order to assess the possibility of complying with the request, in the affirmative updating the database with an indication of an access reservation; and, in response, sending the user an SMS message confirming the reservation or denying the availability of access.

17. The system set forth in claim 16, comprising a device for blocking access of the vehicles to the controlled areas, capable of communicating with the control unit and the users.

18. The system set forth in claim 16, comprising a station for commanding vehicle tow-away apparatus, the station being capable of communicating with the control unit.

19. The system set forth in claim 16, comprising a station of a police and/or public security department, the station being capable of communicating with the control unit.

* * * * *